(12) United States Patent
Ruiz et al.

(10) Patent No.: US 8,422,846 B2
(45) Date of Patent: Apr. 16, 2013

(54) FIBER MANAGEMENT COMPONENT

(75) Inventors: Gil Ruiz, McKinney, TX (US); Thomas Crain, Melissa, TX (US); Gary F. Gibbs, Wylie, TX (US); Joseph C. Livingston, Frisco, TX (US); Aly Fahd, Dallas, TX (US)

(73) Assignee: CommScope, Inc. of North Carolina

( * ) Notice: Subject to any disclaimer, the term of this patent is extended or adjusted under 35 U.S.C. 154(b) by 382 days.

(21) Appl. No.: 12/706,986

(22) Filed: Feb. 17, 2010

(65) Prior Publication Data

US 2011/0038589 A1 Feb. 17, 2011

Related U.S. Application Data

(60) Provisional application No. 61/233,555, filed on Aug. 13, 2009.

(51) Int. Cl.
*G02B 6/00* (2006.01)
*G02B 6/36* (2006.01)
*G02B 6/38* (2006.01)

(52) U.S. Cl.
USPC ............... 385/135; 385/53; 385/59; 385/136

(58) Field of Classification Search ............... 385/53, 385/59, 134, 135, 136
See application file for complete search history.

(56) References Cited

U.S. PATENT DOCUMENTS

| 4,826,277 | A | | 5/1989 | Weber |
| 4,884,862 | A | | 12/1989 | Kofod |
| 5,428,705 | A | * | 6/1995 | Hermsen et al. ............... 385/135 |
| 5,548,678 | A | | 8/1996 | Frost |
| 6,061,492 | A | | 5/2000 | Strause |
| 7,270,485 | B1 | | 9/2007 | Robinson |
| 7,376,322 | B2 | | 5/2008 | Zimmel |
| 2006/0254817 | A1 | * | 11/2006 | Caveney ........................ 174/481 |
| 2008/0175550 | A1 | * | 7/2008 | Coburn et al. ................. 385/134 |

FOREIGN PATENT DOCUMENTS

| EP | 0844504 A2 | 5/1998 |
| JP | 2004-198709 | 7/2004 |
| JP | 2007-279216 | 10/2007 |

* cited by examiner

*Primary Examiner* — Brian Healy
*Assistant Examiner* — Hung Lam
(74) *Attorney, Agent, or Firm* — Muncy, Geissler, Olds & Lowe, PLLC

(57) ABSTRACT

A fiber management device includes a first member having a floor, a first end, a second end and first and second sides, the first end including at least one holder for securing at least one optical fiber adapter to the first member, the second end including a frame holding a plurality of fiber optic connectors, the first side and second sides including first and second fiber guide structures. A first optical fiber connector is in the at least one holder, and includes a first plurality of optical fibers forming a first loop on the floor that contacts the first fiber guide structure and the second fiber guide structure. A second member includes a housing releasably connected to the first member and defining with the first member an enclosure for the first loop.

13 Claims, 8 Drawing Sheets

FIBER MANAGEMENT COMPONENT

CROSS-REFERENCE TO RELATED APPLICATIONS

The present application claims the benefit of U.S. Provisional Patent Application No. 61/233,555, filed Aug. 13, 2009, the entire contents of which is hereby incorporated by reference.

FIELD OF THE INVENTION

The present invention is directed toward a fiber management component having a fiber support member and a detachable cover, and, more specifically, toward a fiber management component having a fiber support member configured to support at least one loop of fiber in a fan-out space and a detachable cover for protecting the at least one loop of fiber.

BACKGROUND OF THE INVENTION

A known type of optical fiber management component is connectable to a trunk cable and includes a plurality of connectors having female receptacles. Multiple optical fibers from the trunk cable are fanned out inside the component and individually connected to the connectors. Male connectors can be plugged into the female receptacles to form a connection between a fiber optic cable attached to the male connector and one of the fibers of the trunk cable.

A modular fiber optic management component that may be mounted on a panel in a rack is sold under the trade name INSTAPATCH by the assignee of the present application. This component is essentially a metal case in which a fan-out assembly is mounted. The component assembly is a fixture constructed to hold a fan-out cable in a desired configuration with one end in a position to connect to a trunk cable and with the individual optical fibers ready to be connected to connectors. The fixture keeps the fibers organized and substantially prevents them from exceeding their minimum bend radius. Fan-out assemblies may be tested before they are incorporated into an assembly such as the fiber management component.

The management component also includes a housing supporting a plurality of connectors and one or more multiple path optical adapters. To produce the management component, the fan-out assembly is mounted in the housing, and ends of the fan-out cables are connected to the multiple path optical adapters and to the individual connectors. A suitable cover is then added to the housing to protect the fan-out assembly inside, and the component is tested again to help ensure that the assembly process has not damaged the delicate optical fibers. The component is then mounted in a panel in a rack, and one or more optical fiber trunk lines are attached to the multiple path optical adapters. Three such conventional management components mounted in a panel which is mountable in a conventional rack are illustrated in FIG. 8.

It is sometimes desirable to increase the density of fiber optic connectors such as the ones discussed above. However, the minimum bend radius of the optical fibers in the management component limits the minimum width of conventional management components, and for many products, only three management components can be mounted in the width of a conventional rack. It would therefore be desirable to provide an optical fiber management component having a reduced width without exceeding the minimum bend radius of the optical fibers fanned out therein.

SUMMARY OF THE INVENTION

These and other problems are addressed by embodiments of the present invention, a first embodiment of which comprises a fiber management device that includes a first member and a second member. The first member includes a floor, a first end, a second end and first and second sides, the first end includes at least one holder for securing at least one optical fiber adapter to the first member, and the second end includes a frame holding a plurality of fiber optic connectors. The first side includes a first fiber guide structure and the second side includes a second fiber guide structure. A first optical adapter is in the at least one holder. The first optical adapter includes a first plurality of optical fibers extending therefrom and forming a first loop on the floor, which first loop contacts the first fiber guide structure and the second fiber guide structure. The first plurality of fibers is connected to a first subset of the plurality of fiber optic connectors. The second member includes a housing releasably connected to the first member that defines with the first member an enclosure for the first loop.

Another aspect of the invention comprises a fiber management device that includes a housing and an optical fiber fan-out support removably mounted to the housing. The optical fiber fan-out support includes a floor having first and second ends and first and second sides. The first end includes at least one holder for securing a fan-out cable to the first member, and the second end includes a frame supporting a plurality of fiber optic connectors. First and second guide elements extend along the first and second sides, and the optical fiber fan-out support includes first and second first latch elements. The housing includes first and second second latch elements configured to releasably engage the first and second first latch elements of the optical fiber fan-out support and to define with the optical fiber fan-out support a substantially enclosed fan-out space between the at least one holder and the plurality of fiber optic connectors.

A further aspect of the invention comprises a fiber management device that includes a first member and a second member. The first member includes a floor, a first end, a second end, first and second sides, and a fiber management arrangement for maintaining a position of an optical fiber. The first end includes at least one holder configured to secure a fiber optic cable to the first member, and the second end includes a frame holding a plurality of fiber optic connectors. The second member is releasably connected to the first member and defines with the first member a substantially enclosed optical fiber fan-out space between the at least one holder and the frame.

BRIEF DESCRIPTION OF THE DRAWINGS

These and other aspects of embodiments of the present invention will be better understood after a reading of the following detailed description together with the attached drawings wherein.

DETAILED DESCRIPTION

Figure 1:
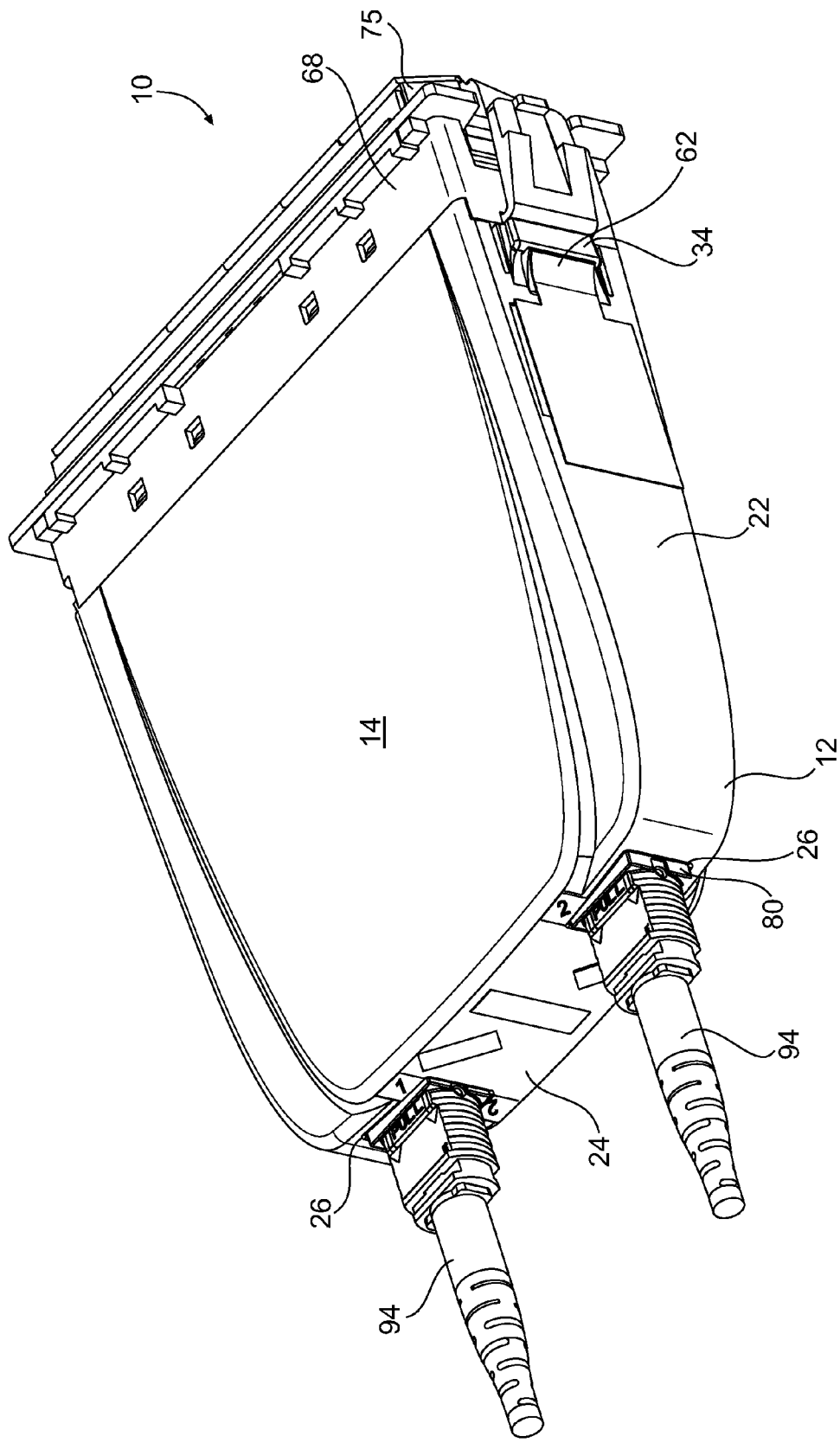
FIG. 1 is a perspective view of a fiber management component according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
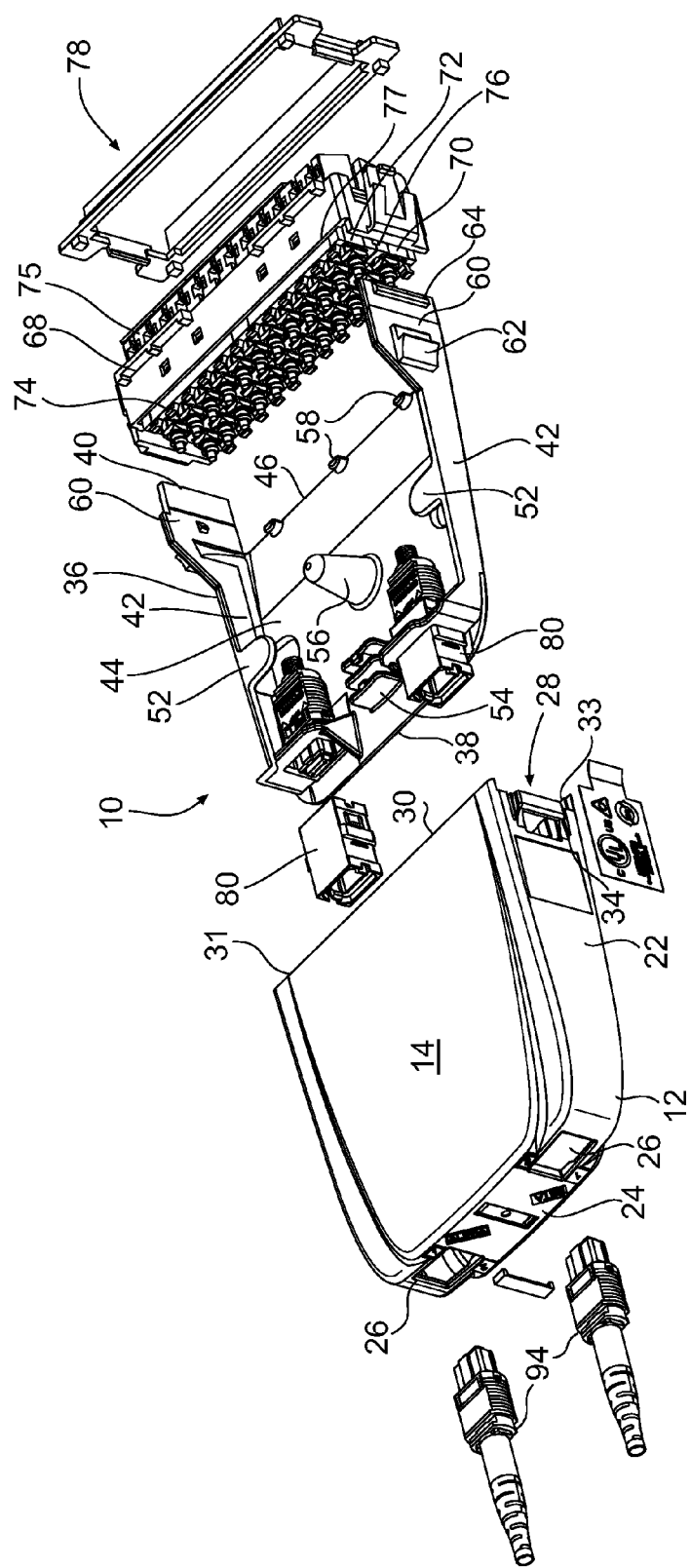
FIG. 2 is an exploded view of the fiber management component of FIG. 1 which includes a support element, a frame holding a plurality of connectors, and a housing.
Figure 4:
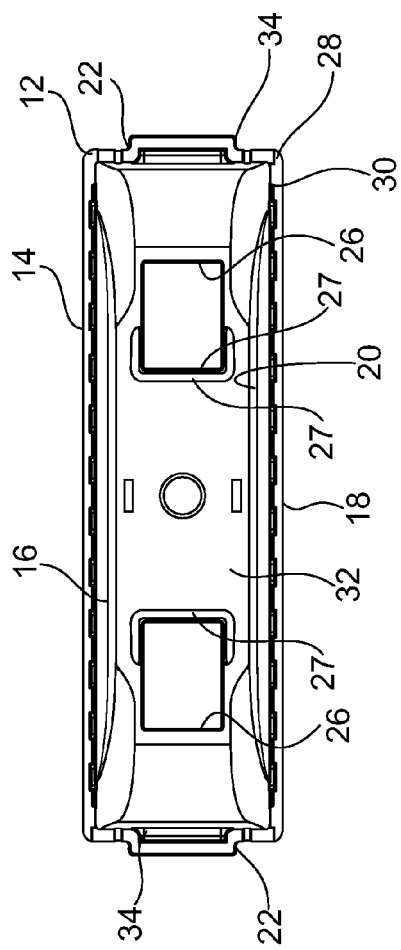
FIG. 4 is a front elevational view of the housing of FIG. 2.
Figure 5:
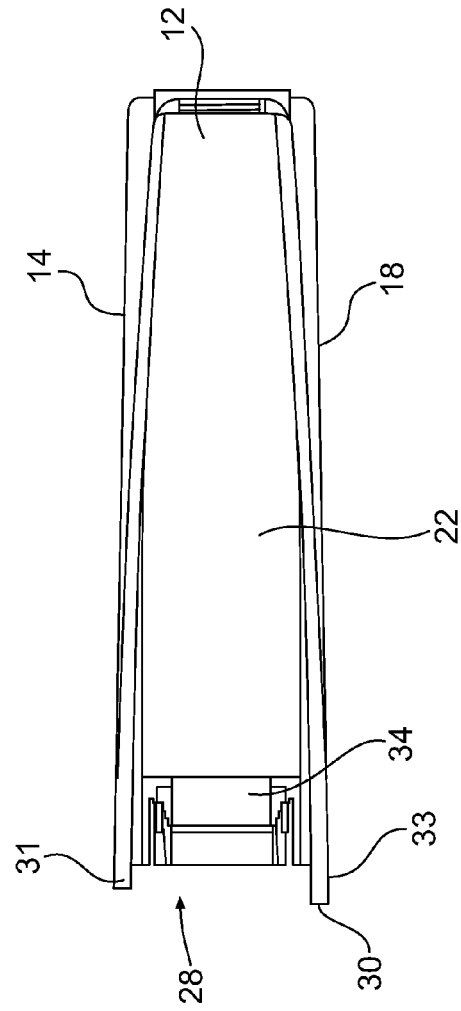
FIG. 5 is a side elevational view of the housing of FIG. 2.

FIG. 1 illustrates a fiber management component 10, and FIG. 2 shows the elements of component 10 in exploded form. Component 10 includes a housing 12 having a top wall 14 having an interior surface 16 (best seen in FIG. 4), a bottom wall 18 having an interior surface 20 and first and second side walls 22. The housing 12 also includes an end wall 24 having first and second apertures 26, C-shaped guide elements 27 adjacent each of the first and second apertures 26, and an open end 28 having an end edge 30. Open end 28 provides access to housing interior 32. End edge 30 includes an upper lip 31 and a lower lip 33, and lower lip 33 extends from housing 12 a greater distance than upper lip 31. First and second side walls 22 include latch receivers 34 near end edge 30.

Figure 3:
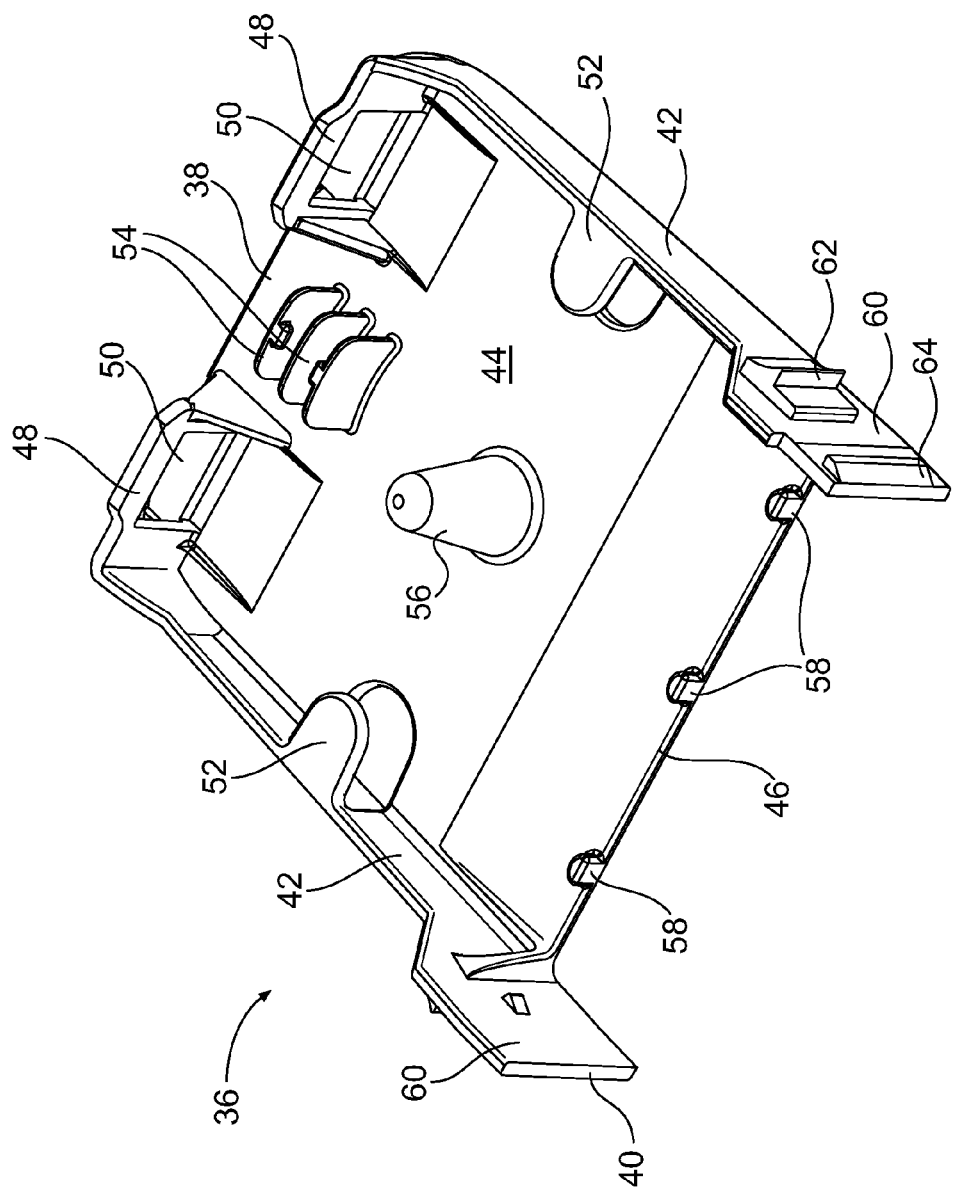
FIG. 3 is a perspective view of the support element of FIG. 2.

Component 10 also includes a support element 36, illustrated separate from housing 12 in FIG. 3, which support element 36 has a first end 38, a second end 40, first and second side walls 42 and a floor 44 having an interior edge 46 located inwardly of second end 40 of support element 36. Two holders 48 comprising upstanding walls with openings 50 are provided at first end 38 for securing cables or adapters as described hereinafter to support element 36, and side walls 42 each include a tab 52 extending over floor 44. Floor 44 further includes a plurality of separator tabs 54 extending from floor 44 near first end 38, a post 56 projecting from a central portion of floor 44 and a plurality of stops 58 along interior edge 46 of floor 44. First and second side walls 42 each include terminal portions 60 which extend beyond interior edge 46 of floor 44, and each terminal portion 60 is provided with a latch element 62 configured to cooperate with latch receivers 34 of housing 12. The terminal portions 60 each also include a retainer element 64.

Component 10 further includes a frame 68 holding a first row 70 and a second row 72 of fiber optic connectors 74 which include female receptacles 75 into which male fiber optic connectors (not illustrated) can be inserted. Frame 68 also includes a slot 76 configured to cooperate with retainer element 64 of support element 36 to secure frame 68 to support element 36, and a first stop 77 extends along the top of frame 68 and a second stop (not illustrated) generally similar to first stop 77 extends along a corresponding portion of the bottom of frame 68. A front piece 78 is connectable to frame 68, and first stop 77 extends further from front piece 78 than the second stop.

Figure 6:
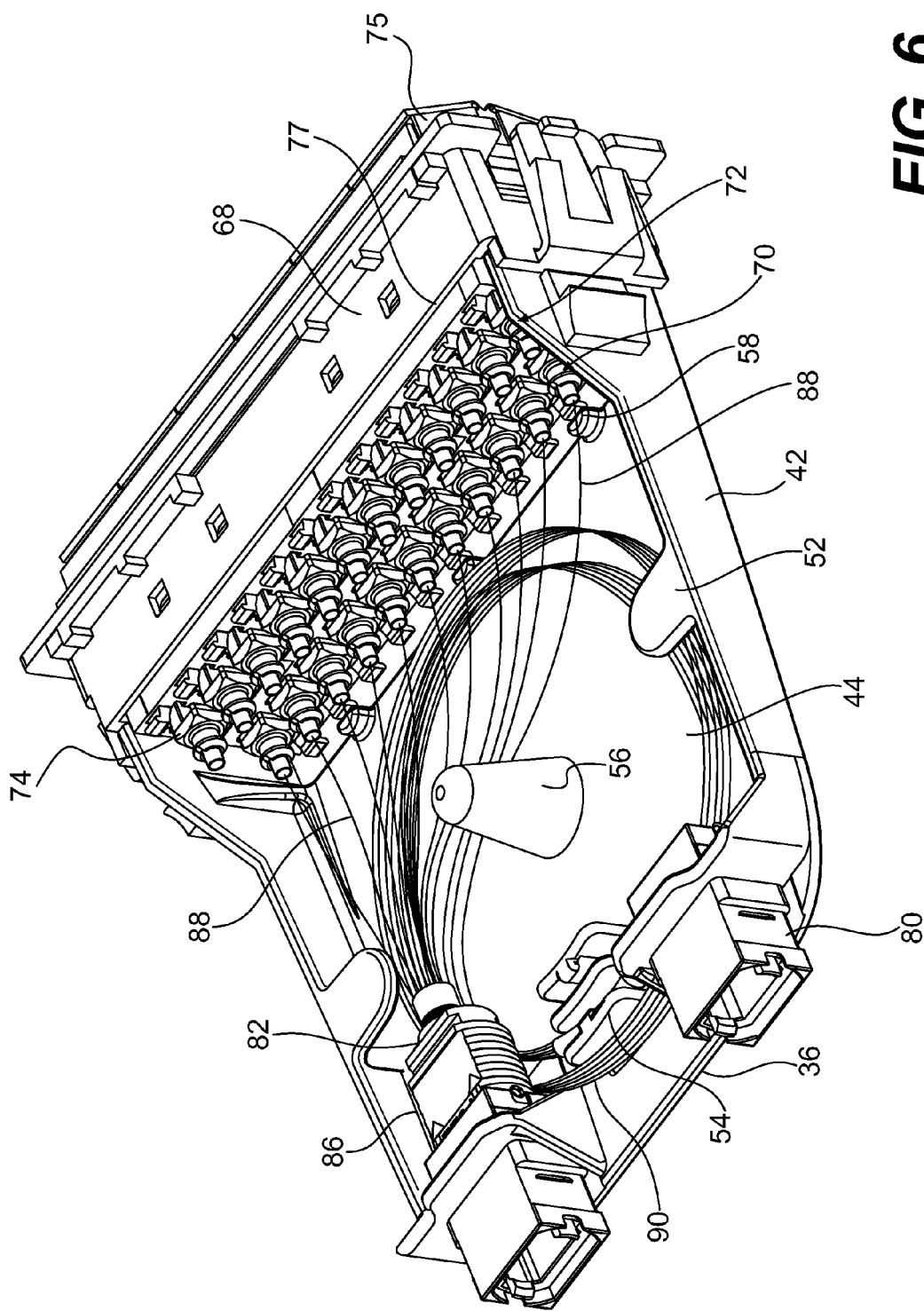
FIG. 6 is a perspective view of the frame and connectors and support element of FIG. 2 with a first fan-out cable attached to the support element and to the connectors.
Figure 7:
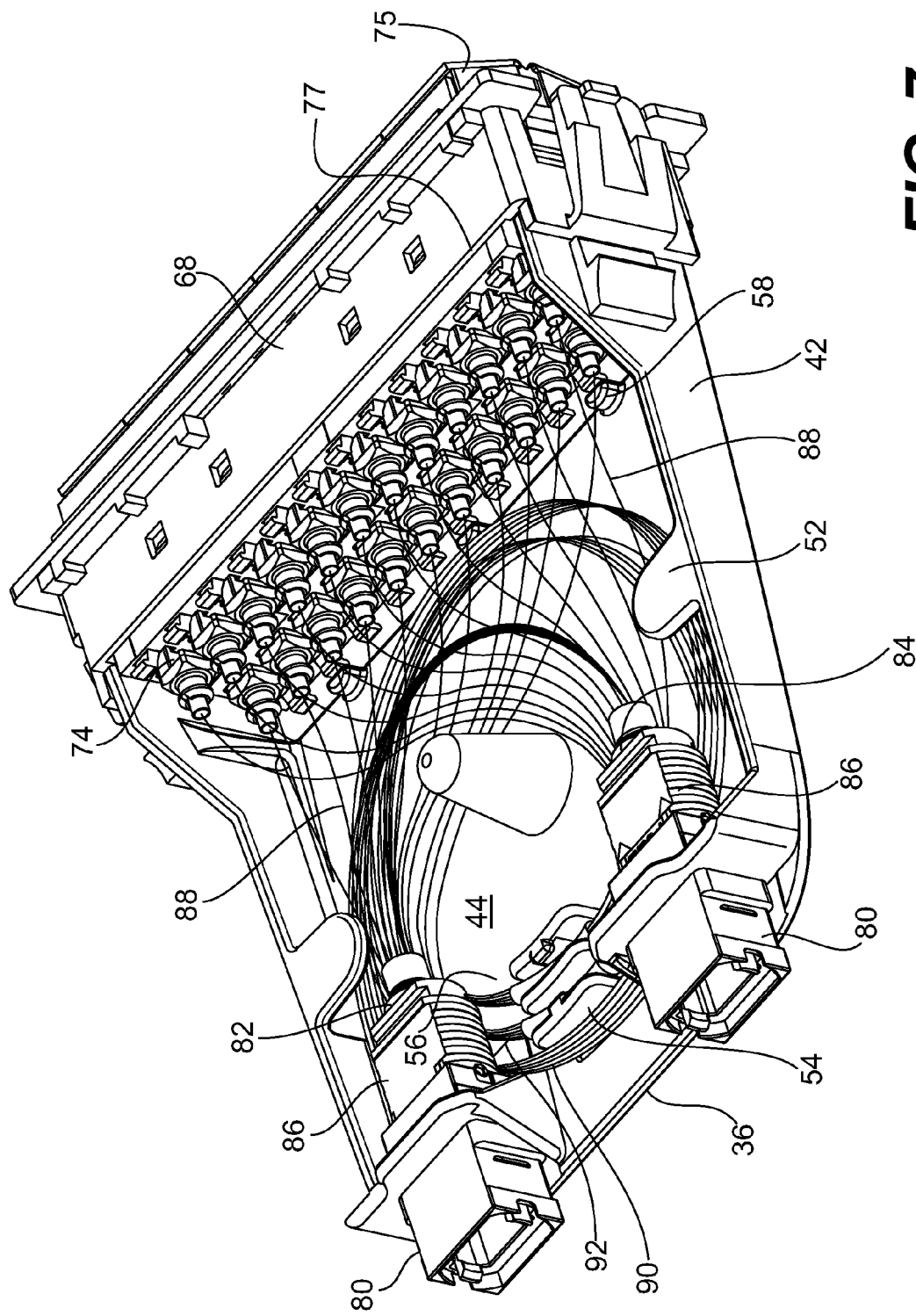
FIG. 7 is a perspective view of the frame and connectors and support element of FIG. 2 with first and second fan-out cables attached to the support element and to the connectors.

To assemble component 10, frame 68 is placed between the terminal portions 60 of the first and second sidewalls 42 of support 36 until a portion of frame 68 abuts interior edge 46 of floor 44 and stops 58 and retainer element 64 of support member 36 engages slot 76 of frame 68. Multipath optical adapters 80 are then mounted in openings 50 of holders 48, and a first fiber optic fan-out cable 82 and second fiber optic fan-out cable 84, illustrated in FIGS. 6 and 7, are connected between the multipath optical adapters 80 and the connectors 74 as described below.

Each fiber optic fan-out cable comprises a connector 86 housing a plurality of individual optical fibers 88 which extend from connector 86 and are connectable to fiber optic connectors 74. First fan-out cable connector 82 is connected to one of the multipath optical adapters 80, and the individual optical fibers 88 are formed in a first loop 90 on floor 44 which first loop 90 extends beneath the tab 52 of one of first and second side walls 42, toward connectors 74, possible contacting one or more of stops 58, beneath the tab 52 of the other of first and second side walls 42, around or between a first one of separator tabs 54 and to a first subset of the connectors 74, the connectors in first row 70 of frame 68, for example. The fibers 88 of first fan-out cable 82 are coiled in a clockwise direction as viewed from above. The second fan-out cable 84 is connected between one of the multipath optical adapters 80 and a second subset of the connectors 74 in frame 68, the connectors in the second row 72, for example. Second fan-out cable 84 forms a second loop 92 running in a counterclockwise direction, and a portion of the second loop 92 is separated from a nearby portion of first loop 90 by one of the separator tabs 54.

Support 36 thus performs some of the functions of the fan-out assemblies that were mountable inside housings in conventional fiber management structures. Guide structures formed by first and second side walls 42, together with tabs 52, stops 58 and separator tabs 54 organize the first and second loops of fiber 90, 92 in a given space that is large enough to maintain at least a minimum bend radius of the fibers 88.

After the first and second fan-out cables 82 and 84 are mounted on support 36, first end 38 of support 36 is inserted through open end 28 of housing 12 along interior surface 20 of bottom wall 18 until first lip 31 of housing 12 engages first stop 77 on frame 68 and second lip 33 engages the second stop on frame 68 and latch elements 62 on support 36 engage latch receivers 34 on sidewalls 22 of housing 12. Because first lip 31 is shorter than second lip 33 and first stop 77 extends further from front piece 78 than the second stop, support 36 can only be mounted in housing 12 in the correct orientation; in the incorrect orientation, the longer second lip 33 will engage the wider first stop 77 and prevent support 36 from fully entering and latching to housing 12. During the insertion, guides 27 help guide multipath adapters 80 into the first and second openings 26. Post 56 engages interior surfaced 16 of top wall 14 to provide support for the top wall 14 and make component 10 more resistant to forces against the top wall 14 and bottom wall 18. Meanwhile, multipath adapters 80 in holders 48 project through apertures 26 in housing end wall 24 so that one end of each multipath adapter 80 is accessible from outside housing 12 thereby allowing trunk cables 94 to be connected to the fiber management component 10.

Figure 8:
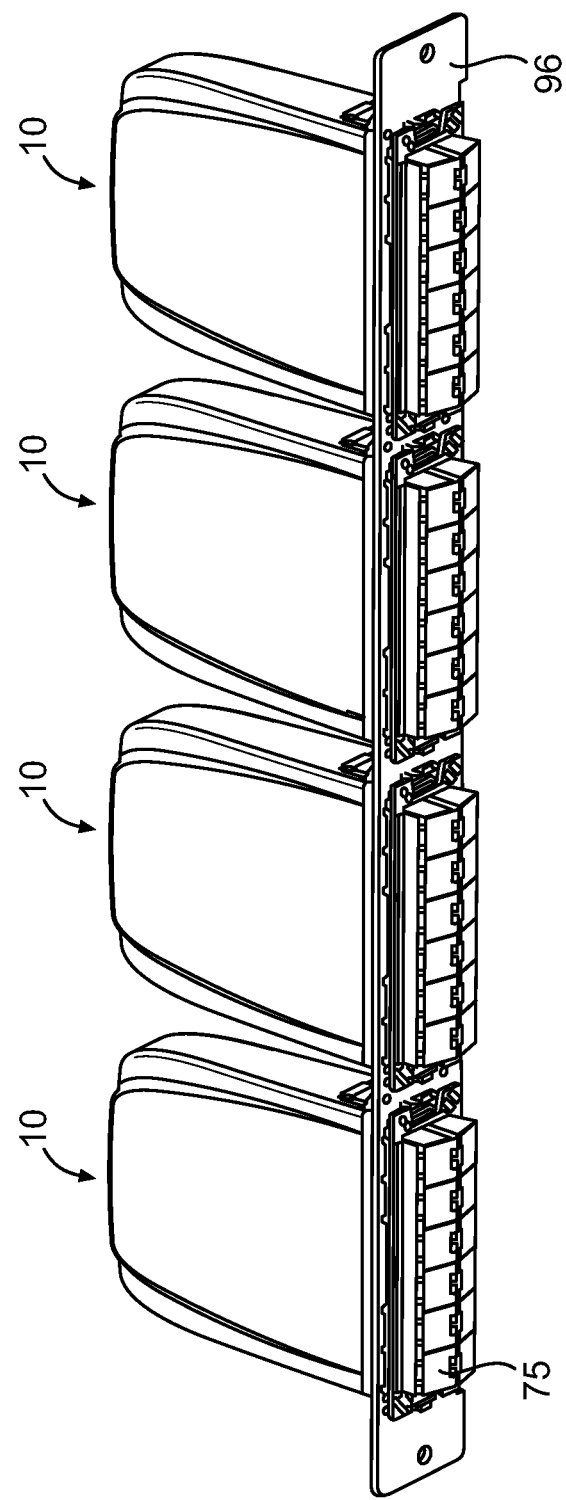
FIG. 8 is a perspective view of four fiber management components according to an embodiment of the present invention mounted in a panel.
Figure 9:
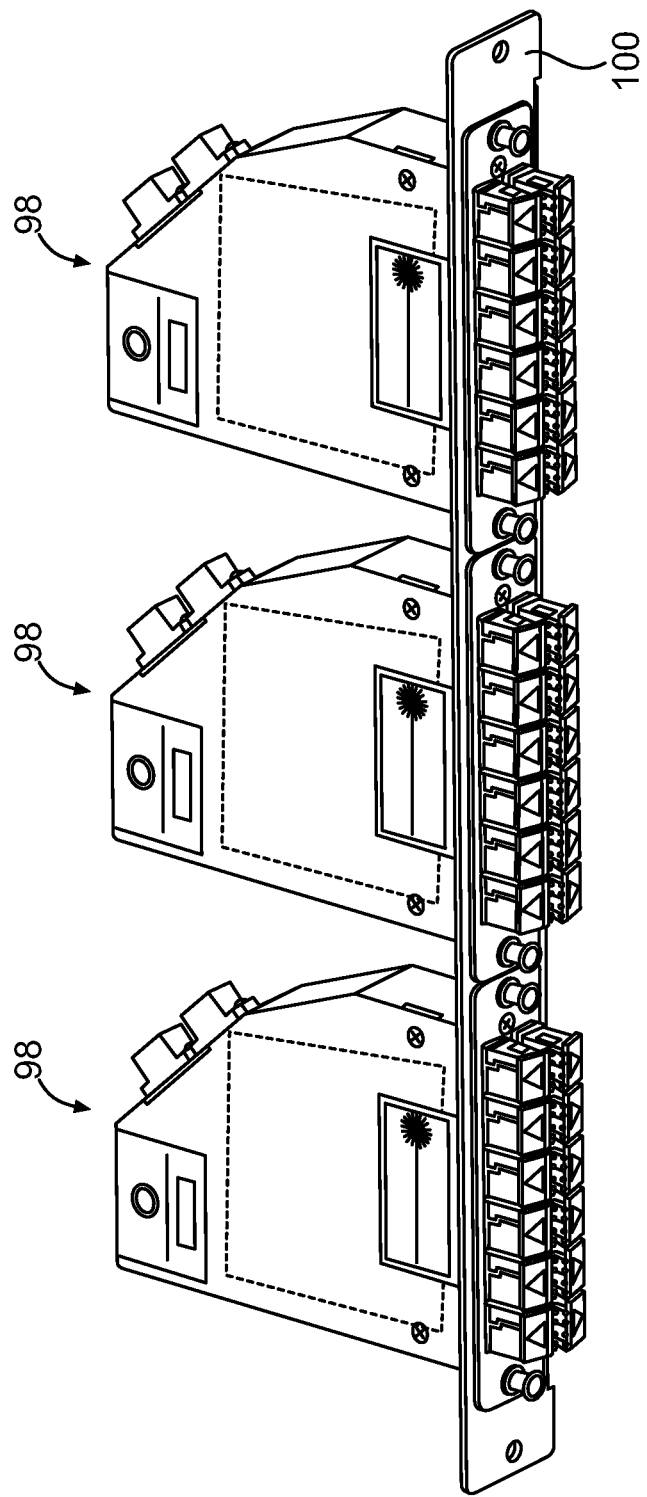
FIG. 9 is a perspective view of three conventional fiber management components mounted in a conventional panel.

Beneficially, the above construction may reduce the number of testing steps required for the component because the fan-out cables 82 and 84 are installed on support element 36 and can be tested at that stage instead of testing after being assembled in a fan-out assembly and a second time after being mounted in a fiber management component. Furthermore, by eliminating the use of a separate fan-out assembly inside a housing, the width of the housing can be reduced while maintaining the minimum bend radius of the optical fibers 88. This size reduction is sufficient to allow four fiber management components 10 to be arranged in a panel 96 of a given width as illustrated in FIG. 8 which given width would only have been adequate to accommodate three conventional fiber management components 98 in a panel 100 as illustrated in FIG. 9.

The present invention has been described herein in terms of a presently preferred embodiment. However, modifications and additions to this embodiment will become apparent to those of ordinary skill in the relevant arts upon a reading of the foregoing description. It is intended that such modifications and additions form part of the present invention to the extent they fall within the scope of the several claims appended hereto.

We claim:

1. A fiber management device comprising:
a first member comprising a floor, a first end, a second end and first and second sides, said first end including at least one holder for securing at least one optical adapter to said first member, said second end including a frame holding a plurality of fiber optic connectors, said first side including a first fiber guide structure and said second side including a second fiber guide structure;
a first optical fiber adapter in said at least one holder, said first optical fiber adapter including a first plurality of optical fibers extending therefrom and forming a first loop on said floor, said first loop contacting at least one of said first fiber guide structure and said second fiber guide structure, said first plurality of optical fibers being connected to a first subset of said plurality of fiber optic connectors;
a second member comprising a housing releasably connected to said first member and defining with said first member an enclosure for said first loop.

2. The fiber management device of claim 1 wherein said at least one holder comprises first and second holders and including a second optical fiber adapter in said second holder, said second optical fiber adapter including a second plurality of optical fibers extending therefrom and forming a second loop, said second loop contacting at least one of said first fiber guide structure and said second fiber guide structure, said second plurality of optical fibers being connected to a second subset of said plurality of fiber optic connectors.

3. The fiber management device of claim 2 wherein said housing includes an open end for slidably receiving a portion of said first member, an end wall opposite said open end having first and second openings aligned with said first and second holders, and first and second guides adjacent said first and second openings configured to guide said first and second fiber optic adapters toward said first and second openings.

4. The fiber management device of claim 1 wherein said first fiber guide structure comprises a first wall extending from said floor and said second fiber guide structure comprises a second wall extending from said floor.

5. The fiber management device of claim 4 wherein said first fiber guide structure includes a first tab projecting from said first wall over a first portion of said first loop and said second fiber guide structure includes a second tab projecting from said second wall over a second portion of said first loop.

6. The fiber management device of claim 2 including at least one separator tab extending from said floor and separating a first portion of said first loop from a first portion of said second loop.

7. The fiber management device of claim 3 wherein said open end includes a first lip extending a first distance from said housing and a second lip extending a second distance greater than said first distance from said housing, and wherein said frame includes a first frame stop engaging said first lip and a second frame stop engaging said second lip.

8. The fiber management device of claim 4 wherein:
said first wall includes a first latch element for engaging a first complementary latch element on said housing; and
said second wall includes a second latch element for engaging a second complementary latch element on said housing.

9. A fiber management device comprising:
a housing; and
an optical fiber fan-out support removably mounted to said housing, said optical fiber fan-out support comprising a floor having first and second ends and first and second sides, said first end including at least one holder for securing a fan-out cable to said first optical fiber fan-out support, and first and second guide elements extending along said first and second sides, said optical fiber fan-out support including first and second first latch elements, said second end including a frame supporting a plurality of fiber optic connectors;
said housing including first and second second latch elements configured to releasably engage said first and second first latch elements of said optical fiber fan-out support and to define with said optical fiber fan-out support a substantially enclosed fan-out space between said at least one holder and said plurality of fiber optic connectors,
wherein said housing includes an open end and a bottom for slidably supporting said floor of said optical fiber fan-out support and a top extending over said floor of said fiber support, said open end abutting against said frame.

10. A fiber management device comprising:
a first member comprising a floor, a first end, a second end, first and second sides, and fiber management means for maintaining a position of an optical fiber, said first end including at least one holder configured to secure a fiber optic cable to said first member, and said second end including a frame holding a plurality of fiber optic connectors; and
a second member releasably connected to said first member and defining with said first member a substantially enclosed optical fiber fan-out space between said at least one holder and said frame.

11. The fiber management device of claim 10 wherein said fiber management means comprises first and second walls on said floor.

12. The fiber management device of claim 10 wherein fiber management means comprises first and second separator tabs projecting from said floor.

13. The fiber management device of claim 11 wherein said fiber management means comprises a first tab projecting from said first wall and a second tab projecting from said second wall.

* * * * *